United States Patent Office 3,520,331
Patented July 14, 1970

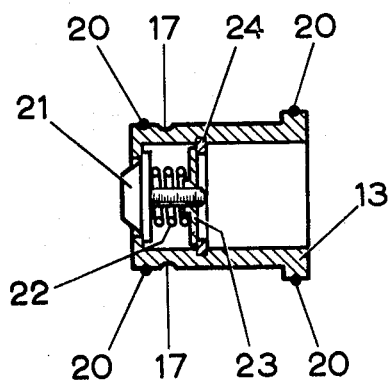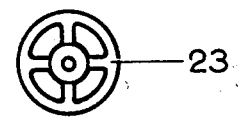
FIG. 4  FIG. 5
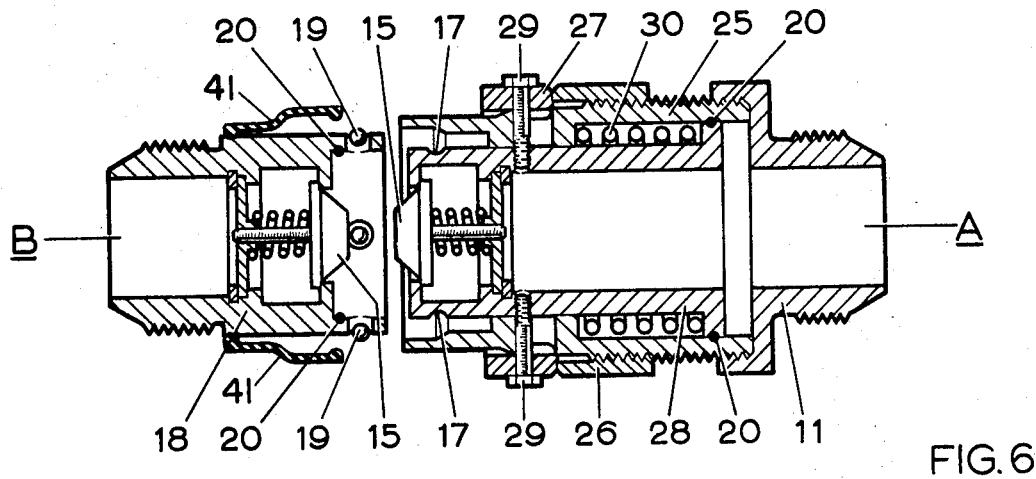
FIG. 6
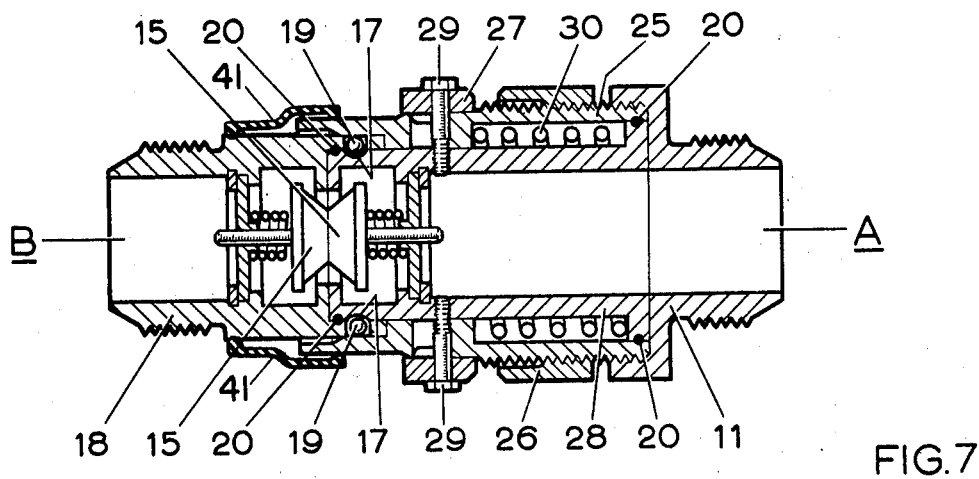
FIG. 7

3,520,331
SELF-SEALING PIPE COUPLING
Walter Frederick Locke, Emsworth, Ernest Arthur Watson, Bedhampton, near Havant, and Leonard Leslie Tyler, Portsmouth, England, assignors to F.P.T. Industries Limited, Portsmouth, England
Filed Dec. 4, 1967, Ser. No. 687,783
Claims priority, application Great Britain, Jan. 3, 1967, 356/67
Int. Cl. F16l 37/22, 37/28
U.S. Cl. 137—614.04                                    5 Claims

ABSTRACT OF THE DISCLOSURE

A coupling for joining two pipes or a pipe and a tank consisting of two halves each half having a valve spring loaded to the closed position.

Figure 1:
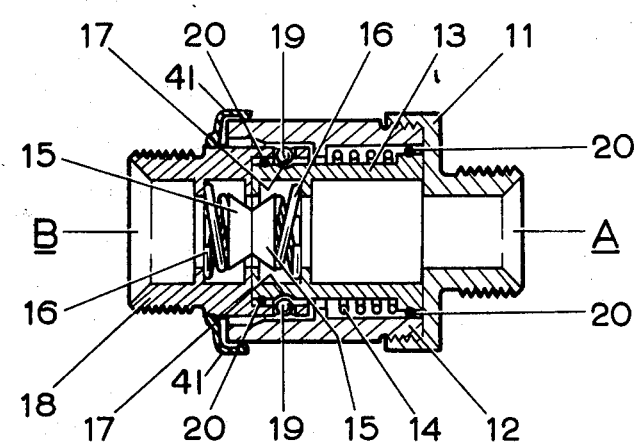

The two halves are held in engagement by balls restricted by a spring loaded sleeve. The sleeve spring is subject to any tensile load applied to the coupling by the pipe or pipes and its strength is arranged so that it allows the sleeve to move, and the coupling to separate, at a tension less than that required to fracture the pipes.

---

This invention relates to self sealing couplings for joining pipes or the like. The couplings consist of two parts, one being fitted to each of the units to be joined. More particularly, the invention relates to couplings, both parts of which include a valve closure member which is urged by a spring towards a seating to seal a passage extending through that part of the coupling and which is in communication with the interior of the corresponding pipe, to seal the pipe. When the two parts of the coupling are brought into engagement with each other the closure members in both parts are forced away from their seatings to provide a passage for gas or liquid to flow through the coupling from one pipe to the other.

In conventional couplings of this form the two parts of the coupling are held in engagement, one with the other, by a securing device such as a bayonet device, or a screw threaded collar which is captive on one part and screws into engagement with the other part. Although a securing device of this form between the two parts of the coupling is desirable in many applications, there are occasions where this may not be so. For example, if the pipeline is liable to be subjected to excessive axial tension, the pipe may fracture before the parts of the coupling break apart, and if the pipeline is, say, a fuel pipeline in a vehicle or aeroplane, the fuel will escape and may cause, or add to, a conflagration.

According to the present invention we provide a self sealing coupling for connecting two fluid containers including a first part of the coupling attached to one of the fluid containers and a second part of the coupling attached to the other fluid container, each part having a valve closure member which is urged by a spring onto a seating to seal a passage which extends through the part and is in communication with the fluid container, both the valve closure members being arranged to be held off their seating when the first part and the second part are in engagement, wherein the first part and the second part are constructed so they are held in engagement with each other by resilient means.

In another aspect of the invention we provide a self sealing coupling for connecting two fluid containers including a first part of the coupling attached to one of the fluid containers and a second part of the coupling attached to the other fluid container, each part having a valve closure member which is hrged by a spring onto a seating to seal a passage which extends through the part and is in communication with the fluid container, both the valve closure members being arranged to be held off their seatings when the first part and the second part are in engagement, wherein the first part and the second part are constructed so that they are held in engagement with each other by resilient means, the construction being such that when the first part and the second part are in engagement with each other and are subject to axial tension in a direction to draw them apart the resilient means is overridden and the two parts are drawn out of engagement with each other so that their valve closure members are free to move onto their seatings.

The resilient means must be sufficiently strong to prevent the two parts of the coupling moving apart under the reaction of the springs which urge the two valve closure members towards their seatings and of the pressure of the fluid within the containers, and will be chosen so that the coupling only breaks apart when a minimum predetermined axial tension is applied through the containers which the coupling is joining. In practice, the coupling will be arranged to break apart at a smaller tension than that at which the containers would fracture.

The fluid containers may be a tank and a pipe or they may be two pipes, and the pipes may be rigid or flexible. The fluid held by the containers may be an inflammable liquid.

The resilient means may be a simple snap fitting, for example, a spring circlip mounted on one part and snapping into and out of engagement with a complementary groove in the other part of the coupling. Preferably, however, one of the parts consists of two relatively movable pieces, one of which is arranged to be mechanically interconnected with the other part of the coupling, and the second of which acts as a guard which locks the mechanical interconnection secure until the tension is applied across the coupling, whereupon the second piece moves relatively to the first piece to unlock the mechanical interconnection and enable the two parts of the coupling to be drawn apart. For example, the first and second pieces may be inner and outer sleeves which are axially slidable relatively to one another, the inner sleeve being arranged to enter a socket in the other part and having one or more grooves in its outer surface which receive balls or other locking pieces extending through the wall of the socket. The outer sleeve is urged by a spring along the inner sleeve to a position in which it closely surrounds the wall of the socket and holds the locking pieces securely in the grooves in the inner sleeve. When tension is applied in the pipeline through the engaged coupling, the spring interposed between the inner and outer sleeves is overridden, so that the outer sleeve slides along the inner sleeve to a position in which the locking pieces are able to move out of the grooves in the inner sleeve and the two parts of the coupling are free to be drawn apart.

Figure 2:
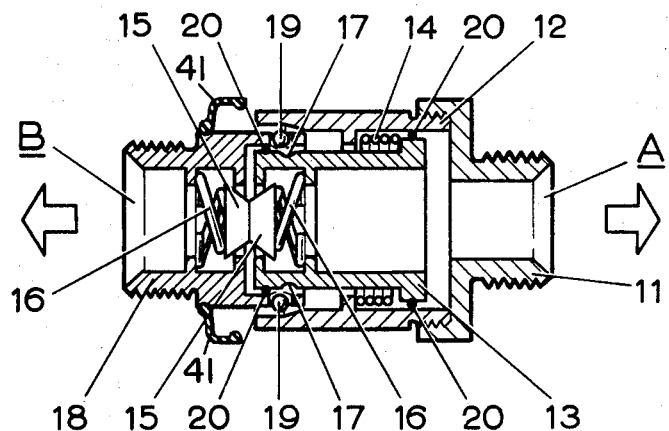
Figure 3:
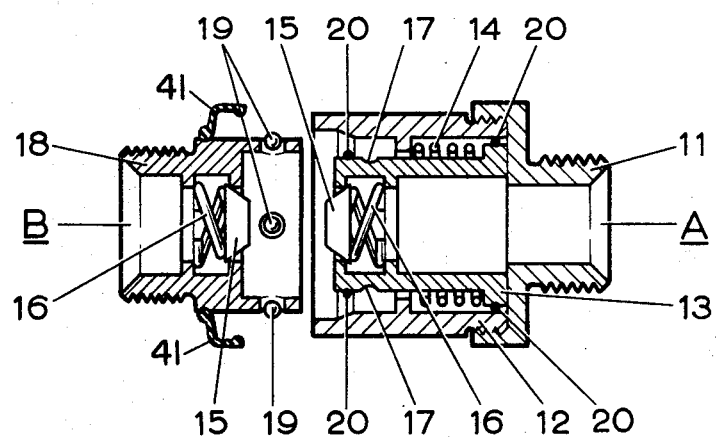

The invention will now be described, by way of example, with reference to the accompanying drawings, in which:

FIG. 1 is a central axial section of one embodiment of the invention showing the two parts of the coupling locked in engagement with each other;

FIG. 2 is a view similar to FIG. 1, but showing the first stage in the release of the coupling upon application of tension across the coupling, FIG. 3 is a view similar to FIGS. 1 and 2, but showing the two parts of the coupling drawn apart, FIG. 4 shows an axial section of a modified inner sleeve, FIG. 5 is a front elevation of a retaining spider used in the sleeve of FIG. 4, FIG. 6 is a central axial section of another embodiment of the invention showing the coupling cocked prior to the engagement of the two parts, and FIG. 7 is a view similar to FIG. 6, but with the two parts locked in engagement with each other.

The coupling shown in FIGS. 1 to 3 consists of two parts A and B. The part A comprises a threaded union nut 11, onto which the end of one pipe will be fitted, the nut screwing onto an outer sleeve 12. Within the outer sleeve is an inner sleeve 13, and interposed between shoulders on these two sleeve a helically coiled compression spring 14. At the outer end of the inner sleeve 13 is a valve consisting of a frustoconical closure member 15 which is urged by a spiral helical spring 16 towards an annular seating to close the passage through the part A. A groove 17 is machined around the end of the inner sleeve 13.

The part B comprises a circular body 18, one end of which is arranged to be fitted into the end of another pipe and the other end of which provides a socket with a surrounding wall which is a close fit between the inner and outer sleeves 13 and 12. The socket wall has four holes through it and forms a cage to retain loosely four balls 19. The part B also includes a valve with closure member 15 and spring 16, similar to the valve in the part A.

The two parts of the coupling are engaged, to join the pipes together in use, by forcing the inner sleeve 13 part way out of the outer sleeve 12, against the action of the spring 14, using a suitable tool. The part B is then inserted between the inner and outer sleeves 13 and 12 until the balls 19 lie in the groove 17 of the inner sleeve. The inner sleeve is then released so that it moves back relatively to the outer sleeve 12, and a reduced diameter portion of the outer sleeve 12 closely overlies the balls 19 and prevents them from moving radially out of the groove 17. A sleeve 21 of impermeable flexible material is affixed to one of the circular bodies such as circular body 18 and makes a sliding connection with the other circular body such as outer sleeve 12 to exclude dust, moisture and the like from the moving parts of the coupling when they are in engagement with each other. As the parts A and B are brought together the valve closure members 15 engage one another and move away from their seatings against the action of the spring 16, to open the valves.

A fluid pressure seal is provided between the parts of the couplings by means of O-sealing rings 20 mounted on the inner sleeve 13.

When excessive axial load is applied to the coupling in the direction of the arrows in FIG. 2, the spring 14 is compressed, allowing the outer sleeve to be retracted over the inner sleeve sufficiently for the balls 19 to come out of the retaining groove 17 into the enlarged diameter part of the outer sleeve. The two parts A and B of the coupling can then be withdrawn. As they are withdrawn the two valves close automatically under the action of the springs 16, so that both pipes will be sealed.

The tension necessary to provide this automatic uncoupling is determined by the characteristics of the spring 14, and these can be chosen as desired.

FIGS. 4 and 5 show a modification in which the frustoconical valve closure members 15 are replaced by a flat faced valve closure member 21 having a spigot which slides through a central aperture in a retaining spider 23 held in position by a circlip 24. A helically coiled compression spring 22 is interposed between the closure member 21 and the spider 23, to urge the valve closure member 21 onto its annular seating.

In another embodiment of the invention, illustrated in FIGS. 6 and 7, the coupling has a modified outer sleeve 25 threaded externally, on which is screwed a cocking ring 26.

On the outer end of the sleeve 25 and clear of the threaded portion, is an unthreaded cocking ring 27 which is retained in relationship to the inner sleeve 28 by bolts 29, but which is allowed to move longitudinally through slots in the outer sleeve 25. The retaining bolts 29 are secured to the inner sleeve 28.

By turning the threaded cocking ring 26 against the unthreaded cocking ring 27, the inner sleeve 28 is forced outwards, against the compresson of the spring 30, until the four balls 19 in the wall of the circular socket 18 are clear of the recessed portion of the outer sleeve, thus allowing the two parts of the coupling to become engaged. The locking of the two parts is accomplished by unscrewing the threaded cocking ring to a neutral position enabling the spring 30 to extend, the inner sleeve to retract, and the locking balls 19 to be housed in their groove 17.

Although various embodiments as described herein and illustrated in the drawings, the invention is not to be considered as limited thereto, and modifications can be made which are within its scope. For example, each part of the coupling may be surrounded by a rubber sleeve, the two sleeves overlapping when the parts of the coupling are in engagement, or other forms of protection against sand, moisture and other environmental hazards may be provided.

We claim as our invention:

1. A self-sealing fluid coupling including two parts engageable with each other, each part having a holding means for connecting the same to a fluid container, a fluid passage therethrough and a valve closure member urged by spring means to close the passage, the said valve closure members being arranged to oppose the spring means to open the passages when the parts are in engagement with each other to place two containers into fluid communication with each other, a first one of said parts including inner and outer sleeves axially movable relative to each other and a resilient means urging the sleeves to a first position relative to each other, the outer sleeve having formed thereon the means for connecting the first part to a container, the second one of said parts including locking pieces arranged to be located within the outer sleeve and engagable with the first part such that when the locking pieces are in said position within the outer sleeve and the sleeves are in the said first relative position, the two parts are held in engagement with each other, the sleeves being movable to a second relative position against the force of said resilient means, and said locking pieces being movable out from within the outer sleeve to disengage the two parts when the sleeves move to said second relative position, the parts being arranged such that forces above predetermined magnitude tending to move the two parts axially away from each other, including both external tension forces acting to move the two said holding means away from each other and fluid pressure forces within the passages, will move the sleeves to the said second relative position, whereby the locking pieces are released from within the outer sleeve and the two said parts are disengaged.

2. A self-sealing coupling according to claim 1 wherein in the inner sleeve is arranged to enter a socket in the second part and said inner sleeve has at least one groove formed in its outer surface to receive said locking pieces, and wherein in the said first position the inner surface of the outer sleeve holds the said locking pieces in the groove, whereby the two parts are held in engagement with each other.

3. A self-sealing coupling including first and second engageable parts, each part having a valve closure member which is urged by a spring means into a seating to seal a passage which extends through the part, both valve closure members being arranged to be held off their seatings when the first part and the second part are in engagement, wherein the first part and the second part are constructed so that they are held in engagement with each other by resilient means, the construction being such that when the first part and the second part are in engagement with each other and are subjected to a predetermined axial tension in a direction to draw them apart, the resilient means is overridden and the two parts are drawn out of engagement with each other, so that their valve closure members are free to move into their seatings, said first part including inner and outer sleeves axially slidable relative to each other, the inner sleeve being arranged to enter a socket in the second part and having at least one groove formed in its outer surface to receive locking pieces connected to the second part and extending through the socket, the outer sleeve being urged by a spring along the inner sleeve to a position in which it closely surrounds the socket and holds the locking pieces in the grooves in the inner sleeve, the said predetermined axial tension allowing the two parts of the coupling to be drawn apart, and wherein the outer sleeve is threaded externally and carries an internally threaded cocking ring arranged to move axially along the outer sleeve by a screwing action and an unthreaded cocking ring arranged to move axially by the action of the threaded cocking ring, the axial movement of the cocking rings compressing the spring to facilitate the engagement of the two parts of the coupling.

4. A self-sealing coupling as claimed in claim 1 wherein the locking pieces are balls.

5. A self sealing coupling as claimed in claim 1, wherein separable environmental protection means surrounds the coupling.

References Cited

UNITED STATES PATENTS

| | | | |
|---|---|---|---|
| 2,599,935 | 6/1952 | Pasker | 137—614.04 |
| 2,690,918 | 10/1954 | Holte | 285—316 |
| 2,860,893 | 11/1958 | Clark | 285—1 |
| 2,898,130 | 8/1959 | Hansen | 137—614.04 |
| 2,926,934 | 3/1960 | Gill | 137—614.04 |
| 3,281,757 | 10/1966 | Bonhomme | 285—321 |

WILLIAM F. O'DEA, Primary Examiner

H. M. COHN, Assistant Examiner

U.S. Cl. X.R.

285—1, 304